United States Patent
Amonou et al.

(10) Patent No.: US 9,681,131 B2
(45) Date of Patent: Jun. 13, 2017

(54) METHODS AND DEVICES FOR ENCODING AND DECODING AT LEAST ONE IMAGE IMPLEMENTING AN ESTIMATION IN THE TRANSFORM DOMAIN, AND CORRESPONDING SIGNAL AND COMPUTER PROGRAM

(75) Inventors: Isabelle Amonou, Cesson Sevigne (FR); Matthieu Moinard, Solna (SE); Pierre Duhamel, Le Plessis Robinson (FR); Patrice Brault, Bures sur Yvette (FR)

(73) Assignee: ORANGE, Paris (FR)

( * ) Notice: Subject to any disclaimer, the term of this patent is extended or adjusted under 35 U.S.C. 154(b) by 873 days.

(21) Appl. No.: 13/807,385

(22) PCT Filed: Jun. 16, 2011

(86) PCT No.: PCT/FR2011/051383
§ 371 (c)(1),
(2), (4) Date: Dec. 28, 2012

(87) PCT Pub. No.: WO2012/001257
PCT Pub. Date: Jan. 5, 2012

(65) Prior Publication Data
US 2013/0101022 A1    Apr. 25, 2013

(30) Foreign Application Priority Data
Jun. 29, 2010   (FR) .................... 10 55260

(51) Int. Cl.
*H04N 7/12* (2006.01)
*H04N 19/625* (2014.01)
(Continued)

(52) U.S. Cl.
CPC ..... *H04N 19/00812* (2013.01); *H04N 19/105* (2014.11); *H04N 19/132* (2014.11);
(Continued)

(58) Field of Classification Search
CPC .......... H04N 19/00812; H04N 19/105; H04N 19/132; H04N 19/18; H04N 19/48;
(Continued)

(56) References Cited

U.S. PATENT DOCUMENTS

| | | | |
|---|---|---|---|
| 2004/0028129 A1* | 2/2004 | Nagumo | ........... G06T 9/20 375/240.08 |
| 2009/0028239 A1* | 1/2009 | Schuur | ........... H04N 19/176 375/240.03 |

FOREIGN PATENT DOCUMENTS

| | | |
|---|---|---|
| EP | 0843484 A1 | 5/1998 |
| EP | 0 843 484 B1 * | 1/2002 |
| EP | 0 843 484 B1 * | 1/2016 |

OTHER PUBLICATIONS

Puri et al., "Improvements in DCT based coding" Proceedings of the International Socieity for Opticial Engineering (SPIE), SPIE USA vol. 3024 No. Part. 01, Feb. 12, 1997, (Feb. 12, 1997) pp. 676-688.*

(Continued)

*Primary Examiner* — Jessica M. Prince
(74) *Attorney, Agent, or Firm* — David D. Brush; Westman, Champlin & Koehler, P.A.

(57) ABSTRACT

A method and device are provided for encoding at least one image broken up into blocks. The method includes, for at least one current block, transforming the current block from the spatial domain into a transformed domain, outputting a transformed block including of a set of coefficients representative of the current block, referred to as original coefficients. The method further includes selecting a subset of original coefficients from the set and, for at least one original coefficient of the subset, the following steps: estimating the original coefficient, outputting an estimated coefficient in the transformed domain; determining a residual of a coefficient (Continued)

by comparing the original coefficient and the estimated coefficient; and encoding the residual of a coefficient.

12 Claims, 4 Drawing Sheets

(51) Int. Cl.
| | | |
|---|---|---|
| *H04N 19/105* | (2014.01) | |
| *H04N 19/61* | (2014.01) | |
| *H04N 19/593* | (2014.01) | |
| *H04N 19/132* | (2014.01) | |
| *H04N 19/18* | (2014.01) | |
| *H04N 19/48* | (2014.01) | |
| *H04N 19/895* | (2014.01) | |

(52) U.S. Cl.
CPC ............ *H04N 19/18* (2014.11); *H04N 19/48* (2014.11); *H04N 19/593* (2014.11); *H04N 19/61* (2014.11); *H04N 19/625* (2014.11); *H04N 19/895* (2014.11)

(58) Field of Classification Search
CPC .... H04N 19/593; H04N 19/61; H04N 19/625; H04N 19/895
USPC .................................................... 375/240.22
See application file for complete search history.

(56) References Cited

OTHER PUBLICATIONS

Puri et al., "Improvements in DCT based coding" Proceedings of the International Society for Optical Engineering (SPIE), SPIE USA vol. 30234 No. Part 01, Feb. 12, 1997 (Feb. 12, 1997) pp. 676-688.*
Puri et al., "Improvements in DCT based coding" Proceedings of the International Society of Optical Engineering (SPIE), SPIE USA vol. 30234 No. Part 01, Feb. 12, 1997 (Feb. 12, 1997) pp. 676-688.*
Puri et al., "Improvements in DCT based coding" Proceedings of the International Society for Optical Engineering (SPIE), SPIE USA vol. 34 3024 No. Part 01, Feb. 12, 1997 (Feb. 12, 1997) pp. 676-688.*
International Search Report and Written Opinion dated Aug. 19, 2011 for corresponding International Application No. PCT/FR2011/051383, filed Jun. 16, 2011.
Puri et al., "Improvements in DCT Based Video Coding", Proceedings of the International Society for Optical Engineering (SPIE), SPIE, USA, vol. 3024, No. Part 1, Feb. 12, 1997 (Feb. 12, 1997), pp. 676-688, XP000199866.
See et al., "Efficient Encoding of DC Coefficients in Transform Coding of Images Using JPEG Scheme", Signal Image and Video Processing, Singapore, Jun. 11-14, 1991, Proceedings of the International Symposium on Circuits and Systems, New York, IEEE, US, vol. 1 of 5, Jun. 11, 1991 (Jun. 11, 1991), pp. 404-407, XP000384794.
Chan et al., "Mathematical Models for Local Non-Texture Inpaintings" SIAM Journal of Applied Mathematics, XX, XX, Jan. 1, 2001 (Jan. 1, 2001), pp. 1-31, XP002335088.
Buades et al., "A Review of Image Denoising Algorithms, With a New One" Multiscale Modeling & Simulation, Society for Industrial and Applied Mathematics, US, vol. 4, No. 2, Jul. 18, 2005 (Jul. 18, 2005), pp. 490-530, XP002496485.
French Search Report and Written Opinion dated Dec. 14, 2010 for corresponding French Application No. 1055260, filed Jun. 29, 2010.
International Preliminary Report on Patentability and English translation of Written Opinion dated Jan. 8, 2013 for corresponding International Application No. PCT/FR2011/051383, filed Jun. 16, 2011.
Osher et al., "Feature-Oriented Image Enhancement Using Shock Filters" SIAM J. Numer Anal., 27:919:940, 1990).

* cited by examiner

METHODS AND DEVICES FOR ENCODING AND DECODING AT LEAST ONE IMAGE IMPLEMENTING AN ESTIMATION IN THE TRANSFORM DOMAIN, AND CORRESPONDING SIGNAL AND COMPUTER PROGRAM

CROSS-REFERENCE TO RELATED APPLICATIONS

This application is a Section 371 National Stage Application of International Application No. PCT/FR2011/051383, filed Jun. 16, 2011, which is incorporated by reference in its entirety and published as WO 2012/001257 on Jan. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images or of image sequences, and especially of video streams.

More specifically the disclosure pertains to the compression of images or image sequences using a representation of images by blocks.

The disclosure can be applied especially to image encoding implemented in JPEG type image encoders for example or to video encoding implemented in present-day video encoders (MPEG, H.264, etc. and their amendments) or in future encoders (ITU-T/ISO HEVC) and to the corresponding decoding.

BACKGROUND OF THE DISCLOSURE

Digital images and image sequences occupy a great deal of memory space, and this means that it is necessary when transmitting these images, to compress them in order to avoid problems of congestion in the communications network used for this transmission. Indeed, the bit rate used on this network is generally limited.

There already exist numerous video data compression techniques. Among them, the H.264 technique implements a prediction of pixels of a current image relatively to other pixels belonging to the same image (intra prediction) or to a previous or following image (inter prediction).

More specifically, according to this H.264 technique, I images are encoded by spatial prediction (intra prediction) and P and B images are encoded by temporal prediction relatively to other I, P or B images (inter prediction) encoded/decoded by means of motion compensation for example.

To this end, the images are sub-divided into macroblocks which are then sub-divided into blocks. Each block or macroblock is encoded by intra or inter image prediction.

Classically, the encoding of the current block is done by means of a prediction of the current block, called a predicted block, and a prediction residue, corresponding to a difference between the current block and the predicted block. This prediction residue, also called a residual block, is transmitted to the decoder which rebuilds the current block in adding this residual block to the prediction.

The prediction of the current block is done by means of already rebuilt information (preceding blocks already encoded/decoded in the current image, images preliminarily encoded in the context of a video encoding etc). The residual block obtained is then transformed for example by using a DCT (discrete cosine transform) type of transform. The coefficients of the transformed residual block are then quantified, and then encoded by entropy encoding.

The decoding is done image by image and, for each image, it is done block by block or macroblock by macroblock. For each (macro)block, the corresponding elements of the stream are read. The inverse quantification and the inverse transformation of the coefficients of the residual block or blocks associated with the (macro)block are done. Then, the prediction of the (macro)block is computed and the (macro)block is rebuilt by adding the prediction to the decoded residual block or blocks.

According to this compression technique, transformed, quantified and encoded residual blocks are therefore transmitted to the decoder to enable it to rebuild the original image or images.

Unfortunately, during this transmission, it is possible that certain coefficients of these residual blocks will be deteriorated or get lost especially when the transmission is noisy. The use of these residual blocks that get "deteriorated" during the rebuilding of the original image therefore leads to an image of poor quality.

To overcome this problem, it has been proposed especially to randomly restore lost coefficients or sets of lost coefficients in a wavelet-transformed or DCT-transformed block. The coefficients thus restored enable an acceptable image to be rendered to the decoder.

According to these techniques, the position of the lost coefficients is detected in a first phase. Then, in a second phase, these coefficients are restored as a function of the neighborhood (other coefficients or spatial neighborhood in the rebuilt image).

The restoring of the coefficients is therefore implemented at the decoder. In other words, these techniques propose a post-treatment operation aimed at rebuilding a signal that is acceptable to the decoder.

One drawback of these techniques of restoration is that they are costly in terms of resources for the decoder. Indeed, the decoder must first of all identify the position of the lost coefficients before being able to start the restoring phase. The decoder must therefore either proceed "blindly" or have an identification module to identify the position of the lost coefficients to be able to restore the coefficients.

There is therefore a need for a novel technique for encoding/decoding images enabling an improvement in the quality in the rebuilt signal while at the same time simplifying the processing implemented at the level of the decoder.

SUMMARY

An embodiment of the invention relates to a method for encoding at least one image sub-divided into blocks implementing, for at least one current block, a step for transforming said current block from the spatial domain into a transform domain delivering a transform block, said transform block being formed by a set of coefficients representing said current block, called original coefficients.

According to an embodiment of the invention, the method of encoding implements a step for selecting a subset of original coefficients from said set, and for at least one original coefficient of said subset, the following steps:

estimating said original coefficient, delivering an estimated coefficient in said transform domain;

determining a coefficient residue, by comparison of said original coefficient and of said estimated coefficient;

encoding said coefficient residue.

Thus, an embodiment of the invention relies on a novel and inventive approach to encoding, relying on the estimation (prediction) of certain coefficients in the transform domain.

In particular, the current block can be:

a residual block obtained by comparison of a block of an image to be encoded in the spatial domain and a predicted block obtained by prediction of this block to be encoded; or a non-residual block, i.e. a set of pixels in the spatial domain.

Thus, if the current block is a non-residual block, an embodiment of the invention proposes a novel mode of encoding consisting in making a prediction of the current block in the transformed domain rather than in the spatial domain. An embodiment of the invention can thus be applied for example to the encoding of fixed images or to MPEG2 video encoding.

If the current block is a residual block, an embodiment of the invention proposes a "double-level prediction": a first prediction is done classically in the spatial domain to "predict" a block to be encoded and determine a residual block, and then a second prediction is done in the transform domain to "estimate" certain coefficients of the residual block and determine residues of coefficients. An embodiment of the invention can be applied for example to H264 video encoding.

Although these steps for estimating an original coefficient, determining a coefficient residue and encoding the residue could apply to the set of coefficients representing the current block, it is preferable to apply them only to certain coefficients, selected to form the subset.

Indeed, certain coefficients are statistically at a zero value, once quantified, as a function of the prediction mode, the bit rate, etc. Consequently, not estimating them makes it possible to gain processing time and avoids estimating a coefficient with a non-zero value when its original value is zero (in this case, the compression performance would be deteriorated).

Furthermore, certain coefficients are used as "anchor" points or reference points (for example the DC coefficient). In other words, through the original value of these coefficients, the estimation of the other coefficients is improved. In this case, it does not seem desirable to estimate these reference coefficients.

Thus, the proposed solution offers simple processing and requires few additional resources since it is implemented solely for some selected coefficients from among the set of coefficients representing the current block.

In particular, for a given position in the transform block, the difference between an original coefficient and an estimated coefficient (also called a coefficient residue) is encoded so as to enable a precise reconstruction of the coefficient identified by this position at the decoder.

According to an embodiment of the invention, the encoding and the transmission of a coefficient residue instead of an original coefficient is less costly (since the energy associated with the coefficient residue is lower than the energy associated with the original coefficient) and optimizes the transmission bit rate for a same quality of transmission.

An embodiment of the invention thus proposes a novel encoding (and decoding) technique integrating a technique for restoring the signal, a goal of which is to reduce the quantity of information to be transmitted for equivalent quality.

It is recalled that, in the prior art on the contrary, the encoding was not modified. The processing of the signal was done at the decoder only, to restore a signal deteriorated in transmission.

According to a first embodiment, the step for selecting selects the original coefficients localized at a predetermined position in the transform block.

In this way, the decoder can immediately identify the position of the original coefficients to be rebuilt and the encoder does not need to insert a specific piece of information to signal the positions of the original coefficients of the subset.

This first embodiment limits the quantity of information transmitted.

According to a second embodiment, a step for selecting selects the original coefficients according to a predetermined criterion of encoding.

For example, an encoding criterion of this kind belongs to the group comprising:

a transmission bit rate;

a quality of transmission;

a direction of prediction of the current block.

Thus, the number and/or the position of the coefficients of the subset are not unchangeably fixed, and can evolve according to different criteria. These different criteria can be combined.

For example, the original coefficients can be selected according to the transmission bit rate: the higher the bit rate, the greater the number of coefficients forming the subset. Conversely, when the bit rate diminishes, many of the original coefficients are at zero and do not need to be transmitted. It is therefore not necessary to select them and estimate them.

According to another criterion of encoding, the original coefficients are selected in taking account of their neighborhood. For example, the position of the coefficients to be selected to form the subset depends on the direction of spatial prediction used to predict the block to be encoded. Indeed, the direction of prediction chosen enables the coefficients representing the highest frequencies to be grouped together on a same region of the transformed block (for example a same column for a horizontal direction of prediction, or a same row for a vertical direction of prediction).

According to this second embodiment, the decoder should be able to retrieve the number and the position of the original coefficients to be rebuilt.

For example, the decoder knows the direction of prediction used for the spatial prediction and can deduce the position and number of coefficients to be predicted therefrom.

According to another example it is possible, at encoding, to insert a piece of information signaling a position of the original coefficients of the subset in a signal representing the image or images.

This modification of the signal enables the decoder to immediately identify the positions of the original coefficients to be rebuilt.

According to one particular embodiment, the step for estimating implements the following steps:

assigning a zero value to the original coefficients of the subset, delivering a modified transform block;

restoring the modified transform block.

The invention according to this embodiment thus proposes to restore the signal at the encoding, thus reducing the quantity of information to be transmitted for equivalent quality.

For example, the step of restoration implements a technique for minimizing the total variation.

In particular, the step for restoring implements at least one iteration of the following sub-steps:
- transforming the modified transform block from the transform domain into the spatial domain, delivering a modified block in the spatial domain;
- adding the modified block and the predicted block in the corresponding spatial domain, delivering a rebuilt modified block;
- determining, in the spatial domain, a curvature of a rebuilt image comprising the rebuilt modified block;
- updating the original coefficients of the subset, taking account of the curvature, transformed from the spatial domain into the transform domain, and of the modified transform block delivering a new modified transform block.

According to one advantageous variant, the step for restoring processes said original coefficients one after the other according to a rising order of frequency.

In this way, the operation starts by estimating the original coefficients representing low-frequency oscillations and ends with an estimation of the original coefficients representing high-frequency oscillations.

This variant enables a processing of the original coefficients sequentially and therefore makes it possible to benefit, at each iteration, from a more complete rebuilding of the new modified transform block.

Furthermore, it offers better results in terms of compression according to a bit rate/distortion criterion.

In another embodiment, the invention pertains to a device for encoding at least one image sub-divided into blocks comprising means for transforming a current block from the spatial domain into a transform domain, delivering a transform block formed by a set of coefficients representing said current block, called original coefficients.

According to an embodiment of the invention, such a device also comprises:
- means for selecting a subset of original coefficients from said set:
- means for estimating said original coefficient, delivering an estimated coefficient in said transform domain;
- means for determining a coefficient residue, by comparison of said original coefficient and of said estimated coefficient;
- means for encoding said coefficient residue.

Such an encoder is especially adapted to implementing the method for encoding described here above. It is for example a JPEG type image encoder or an H.264 type video encoder.

This encoding device could of course comprise the different features of the method for encoding according to an embodiment of the invention. Thus, the features and advantages of this encoder are the same as those of the method for encoding and are not described in more ample detail.

An embodiment of the invention also pertains to a signal representing at least one image encoded according to the method for encoding described here above.

According to an embodiment of the invention, such a signal carries at least one piece of information signaling a position of the original coefficients of the subset.

This signal could of course comprise the different characteristics pertaining to the method for encoding according to an embodiment of the invention.

It can be noted that it is not necessary to modify the signal if the position of the original coefficients of the subset is known to the decoder or can be retrieved by the decoder.

An embodiment of the invention also pertains to a recording medium carrying the signal as described here above.

Another aspect of the invention pertains to a method for decoding at least one image encoded according to the method for encoding described here above.

Such a method implements a step for rebuilding at least one transform block formed by a set of original coefficients, implementing the following steps for at least one original coefficient of a subset of original coefficients selected from said set:
- decoding a coefficient residue associated with said original coefficient;
- estimating said original coefficient delivering an estimated coefficient in said transform domain;
- rebuilding said original coefficient from said coefficient residue and said estimated coefficient.

An embodiment of the invention thus makes it possible to receive a coefficient residue and to rebuild the corresponding original coefficient rather than receive the original coefficient directly. To this end, the decoding method thus implements the same step of estimation as when encoding.

The characteristics and advantages of this method for decoding are the same as those of the method for encoding and are not described in fuller detail.

In particular, such a method for encoding comprises a step for reading, in a signal representing said at least one encoded image, at least one piece of information signaling a position of the original coefficients of said subset.

In this way, the decoder is immediately capable of identifying the positions of the original coefficients to be rebuilt.

In another embodiment, the invention pertains to a device for decoding at least one image encoded by means of the encoding device described here above.

According to an embodiment of the invention, such as device comprises means for rebuilding at least one transform block formed by a set of original coefficients, implementing, for at least one original coefficient of a subset of original coefficients selected from said set:
- means for decoding a coefficient residue associated with said original coefficient;
- means for estimating said original coefficient delivering an estimated coefficient in said transform domain;
- means for rebuilding said original coefficient from said coefficient residue and said estimated coefficient.

Such a decoder is especially adapted to implementing the method for decoding described here above. It may for example be a JPEG type image decoder or an H.264 type video decoder.

This decoding device could of course comprise the different characteristics pertaining to the method for decoding according to an embodiment of the invention.

An embodiment of the invention also pertains to a computer program comprising instructions to implement a method for encoding and/or a method for decoding as described here above when the program is executed by a processor. Such a program can use any programming language whatsoever. It can be downloaded from a communications network and/or recorded on a computer-readable medium.

BRIEF DESCRIPTION OF THE DRAWINGS

Other features and advantages shall appear more clearly from the following description of a particular embodiment given by way of a simple illustrative and non-exhaustive example and from the appended figures, of which.

DETAILED DESCRIPTION OF ILLUSTRATIVE EMBODIMENTS

1. General Principle

Figure 1:
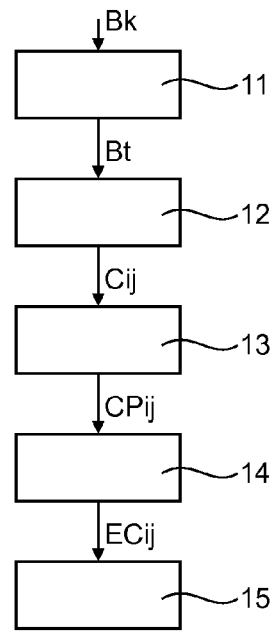
FIG. 1 presents the main steps implemented during the encoding according to an embodiment of the invention.

The general principle of an embodiment of the invention is based on the estimating, at encoding and decoding, of certain coefficients of a current block in the transform domain. It can be noted that such a current block corresponds either to a non-residual block corresponding to a set of pixels of an image to be encoded (in the spatial domain) or to a residual block obtained by comparison of a block of an image to be encoded in the spatial domain and of a predicted block obtained by prediction of this block to be encoded.

Thus, if the current block is a residual block, an embodiment of the invention proposes to transform this residual block and predict (estimate) certain coefficients of this transform block. This estimation is implemented by using the pixels of the causal neighborhood of the current block which can themselves be obtained from the coefficients of the current transform block and from the coefficients of the blocks neighboring the current transform block.

In this way, it is not necessary for the encoder to send the decoder all the coefficients of the transformed residual block after quantification and encoding. Indeed, the encoder can transmit only certain coefficients of the transformed residual block and then, as the case may be, residues of coefficients enabling the rebuilding, at the decoder, of the coefficients of the transformed residual block not transmitted. These residues of coefficients are obtained by comparing the coefficients of the transformed residual block, called original coefficients, with the coefficients obtained during the operation for estimating.

An embodiment of the invention thus proposes a two-level prediction enabling the estimation, in the encoder and the decoder, of certain coefficients of the transformed residual block which therefore do not need to be transmitted to the decoder (only the residues of coefficients corresponding to these coefficients being transmitted to the decoder). Thus, the signal is compressed more efficiently in reducing the quantity of information transmitted.

If the current block is a block of the image to be encoded in the spatial domain (non-residual block), an embodiment of the invention proposes a novel mode of encoding in which a prediction is made of the current block in the transform domain rather than in the spatial domain.

It may be recalled that, classically, the encoding of images or image sequences consists of a transformation of the image from the spatial domain to a transform domain, the purpose of which is to modify the space of representation of the information in order to de-correlate it to the maximum and to group it together in a minimum number of signifying coefficients before starting the operations of quantification and entropy encoding. Such a transformation is for example of the discrete cosine transform (DCT), discrete sine transform (DST), wavelet transform and other types.

2. Working of the Encoder

Here below, we describe the main steps implemented by an encoder according to an embodiment of the invention.

Such an encoder is considered for example to implement a DCT type transform classically used in image or video encoders. Naturally, other transforms can be used according to an embodiment of the invention.

Thus, as illustrated in FIG. 1, such an encoder (for example an image or video encoder) implements the following steps here below, for at least one current block Bk. As indicated here above, the current block can be a non-residual block corresponding to a set of pixels of the image to be encoded or a residual block obtained by comparison of a block to be encoded and a predicted block obtained by prediction of the block to be encoded.

During a transformation step 11, the current block Bk is transformed from the space domain into a transform domain delivering a transform block Bt. Such a transform block is formed by a set of DCT coefficients representing the current block and known as original coefficients.

The encoder then implements a step 12 for selecting a subset of original coefficients from the set of DCT coefficients. This step for selecting 12 enables the selection of certain original coefficients in taking account especially of their position in the transform block Bt.

These few original coefficients selected from the set of DCT coefficients forming the transform block Bt are then processed in a specific way.

More precisely, for at least one original coefficient Cij of the subset, the encoder performs the following steps:
- estimating (predicting) 13 the original coefficient Cij, delivering an estimated coefficient CPij in the transform domain;
- determining 14 a coefficient residue ECij by comparison of the original coefficient Cij and the estimated coefficient CPij;
- encoding 15 the coefficient residue ECij.

The original coefficients of the transformed block Bt that do not belong to the subset obtained at the end of the step for selecting 12 are for their part encoded in a classic way.

The encoding of the transformed block Bt is therefore obtained by encoding only the coefficient residues for the original coefficients belonging to the subset and by encoding the other original coefficients in a classic way.

An embodiment of the invention thus proposes to predict (or estimate), at the encoder and decoder, certain original coefficients of the transform block, thus avoiding the transmission of these original coefficients to the decoder (in transmitting as the case may be the coefficient residue associated with these original coefficients). This enables the signal representing the image or the image sequence to be compressed more efficiently by reducing the quantity of encoded information, while at the same time enabling the identical signal to be rebuilt. Indeed, the coefficient residue, if transmitted, is less costly than the corresponding original coefficient because its energy is lower (if the original coefficient is properly predicted).

Here below, referring to FIGS. 2 to 4, we describe a particular embodiment of the invention.

Figure 2:
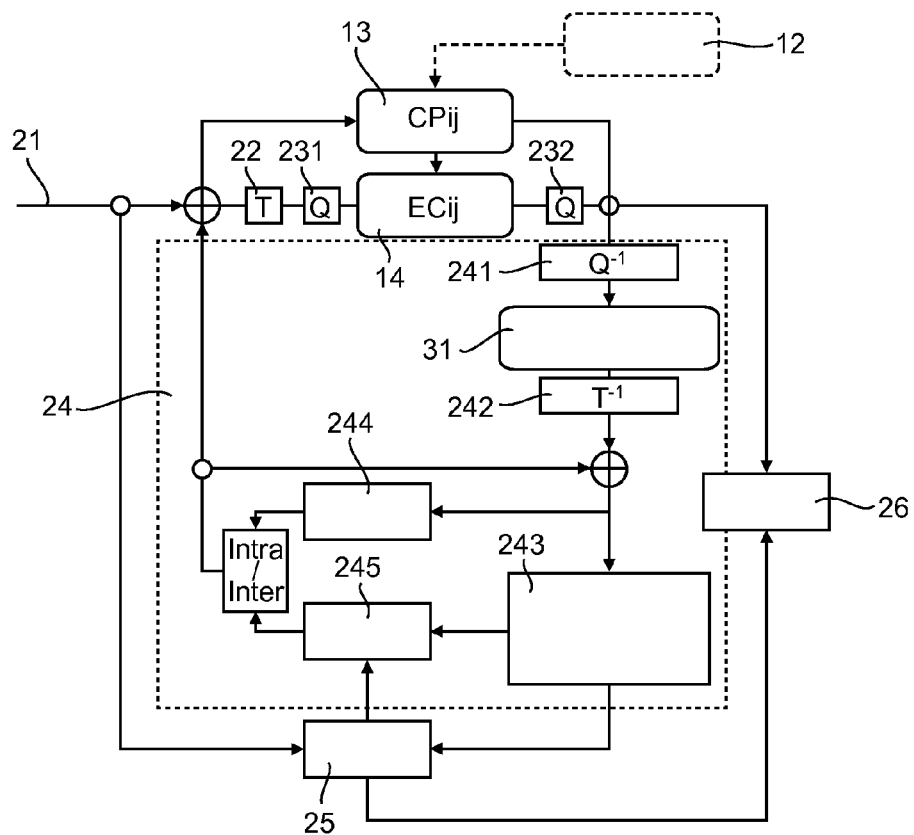
FIG. 2 illustrates an example of an architecture of an encoder according to FIG. 1.

More specifically, FIG. 2 illustrates the architecture of an H.264 type video encoder modified to implement an embodiment of the invention.

Such an encoder inputs a video sequence 21 and implements classic operations of transformation T referenced 22 and quantification Q referenced 231. In the case of the H.264 encoder, the transformation operation T referenced 22 implements a full DCT transform. At the end of these operations, there is therefore a transform block formed by $(K+1) \times (K+1)$ original coefficients Cij (quantified), as illustrated in FIG. 3 (for example 64 original coefficients if K=7, or 16 coefficients if K=3), where i corresponds to the index of the row of the transform block and j corresponds to the index of the column of the transformed block, $0 \leq i, j \leq K$.

As described with reference to FIG. 1, for at least one transform block, a subset of original coefficients to be estimated is selected 12 in taking account especially of their position in the transform block, and these original coefficients are estimated (13). Then the residues of coefficients are determined (14) during a step of compensation during which the original coefficients and the estimated coefficients are compared. A new quantification Q step 232 can then be implemented before the entropy encoding operation 26.

In order to have the same prediction information available to the encoder and the decoder, the encoder classically integrates a decoding loop 24 in its encoding loop.

A decoding loop 24 of this kind implements operations of classic inverse quantification $Q^{-1}$ referenced 241, inverse transformation $T^{-1}$ referenced 242, image rebuilding 243, intra prediction 244 and/or inter prediction 245 (motion compensation). These operations are well known to those skilled in the art and are described in greater detail in the H.264 standard (H.264 JVT—ISO/IEC 14496-10 AVC—ITU-T Recommendation H.264, "Advanced video coding for generic audio-visual services", Nov. 7, 2007).

According to an embodiment of the invention, a decoding loop 24 such as this also integrates an operation of inverse compensation 31 implemented prior to the operation of inverse transformation $T^{-1}$ referenced 242 during which the residues of coefficients are added to the estimated coefficients.

The video sequence 21 and the images rebuilt by intra prediction 244 and/or inter prediction 245 enable the performance of a motion estimation 25 taken into account for the entropy encoding 26. These operations of motion estimation 25 and entropy encoding 26 are classic and are described in greater detail in the above-mentioned standard H.264.

According to this embodiment, the invention lies more particularly in the steps for selecting 12 a subset of original coefficients to be estimated, estimating 13 these original coefficients and determining 14 residues of coefficients associated with these coefficients described here below in greater detail.

A) Selection of Coefficients to be Estimated

More specifically, the step for selecting 12 makes it possible:

either to select the original coefficients localized at a predetermined position in the transformed block;

or to select original coefficients complying with a predetermined criterion of encoding.

In other words, the number and the position of the original coefficients of the subset (also called coefficients to be estimated) can be fixed or can be variable.

It is sought here to find an efficient compromise: if the number of coefficients to be estimated, i.e. the number of original coefficients not transmitted to the decoder, is excessively high, then the image will be far too deteriorated to be able to benefit from an accurate prediction at the decoder; conversely, if this number is too low, the resulting improvement of compression will not be significant.

For example, the inventors have noted that the elimination/prediction of two original coefficients on an 8×8 block of 64 original coefficients gives an efficient compromise between deterioration and compression, whatever the transmission bit rate. The step for selecting 12 then enables the selection of a subset of two coefficients from the set of 64 original coefficients.

According to a first variant, the position of the coefficients to be estimated in the transform block is predefined at the encoder and at the decoder, for example as a function of the size of the blocks.

In this case, it is not necessary for the encoder to insert a piece of information signaling the positions of the original coefficients of the subset in a signal representing the image or the video sequence.

Figure 3:
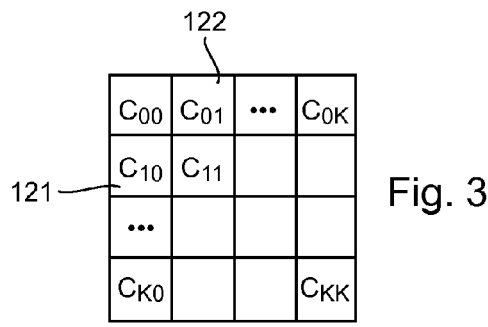
FIG. 3 illustrates a size 8×8 transformed block.

For example, in the case of a JPEG type image encoder, a statistical evaluation makes it possible to know that, for an 8×8 sized transformed block, the most worthwhile coefficients to be eliminated and estimated are the coefficients C01 (122) et C10 (121) as illustrated in FIG. 3.

The selection of the coefficients to be estimated can also be done through a method of evaluation known to the encoder and the decoder. For example, the encoder and the decoder can evaluate the type of image processed in using, as the case may be, the images and the blocks of the current image previously encoded to determine a class of image (smooth image, textured image, etc) and deduce therefrom the position, and possibly the number, of coefficients to be estimated according to an embodiment of the invention.

According to another example, the encoder can use the direction of prediction used for the spatial prediction of the block to be encoded and deduce therefrom the position and number of coefficients to be predicted. For example, if the block to be encoded has been predicted in a vertical direction, the associated residual block comprises a majority of horizontal patterns and the transformation step concentrates the energy on the coefficients of the first row (comprising the coefficients C00, . . . , C0K). It is more prudent in this case to predict the coefficients of this first column since they concentrate the energy of the DCT block.

In a second variant, the position of the coefficients to be predicted is transmitted to the decoder by the encoder.

Thus, for example, in the case of the above JPEG encoder, the two positions of the coefficients C01 and C10 are transmitted into the header of the image.

For a video encoder, it is possible to transmit this information:

at the sequence level: in this case, the coefficients to be estimated are the same for all the images;

at the image level: in this case the coefficients to be estimated are the same for all the blocks of the image or for all the images belonging to the same type (for example: I type images, P type images, B type images, etc).

A signaling at the block level, while it can be envisaged, seems to be excessively costly. In this case, it will be preferred to use a piece of local information such as the direction of prediction to modify or adapt the position and the number of the coefficients to be predicted.

B) Estimation of the Selected Coefficients

Once the subset of original coefficients has been obtained, the encoder implements an estimation 13 of the coefficients of this subset (comprising for example the two original coefficients C01 and C10).

For example, when the current block is a residual block, the estimation step 13 implements the following steps:
- assigning a zero value to the original coefficients of the subset, delivering a modified transform block;
- restoring the modified transform block.

According to the embodiment described here below, the restoration step, also called a regularizing step, implements a technique of regularization in the image domain, based on a minimizing of the total variation of the predicted block.

Here below, we recall the general principle of a technique of this kind for regularizing the signal in the spatial domain, based on the semi-norm of the total variation (denoted as TV).

The document "Feature-oriented image enhancement using shock filters" by S. Osher and L. Rudin (SIAM J. Numer. Anal., 27:919:940, 1990) gives a more detailed description of the technique of restoration based on this standard. Naturally, other standards can be envisaged such as the quadratic standard for example.

The TV semi-norm is used in many image-improvement methods, especially for de-noising and deblurring.

Let u be an image in the spatial domain and u(x) be the value of a pixel of the image u at the position x. The image u in the transform domain is denoted as $\alpha(i)$ (simply denoted $\alpha$ here below). The model proposed consists in estimating a subset of the DCT coefficients of $\alpha$ by their restoration under constraint in the spatial domain, i.e. in the image u.

Let u be an image in the spatial domain and u(x) be the value of a pixel of the image u at the position x. The image u in the transform domain is denoted as $\alpha(i)$ (simply denoted $\alpha$ here below). The model proposed consists in estimating a subset of the DCT coefficients of $\alpha$ by their restoration under constraint in the spatial domain, i.e. in the image u.

Let $u(\alpha,x)$ denote the image obtained from the DCT coefficients of $\alpha$ (i.e. the image corresponding to an inverse transform to return to the spatial domain).

The constraint of regularization in the spatial domain consists in minimizing the total variation TV.

The total variation TV is expressed in the following form:

$$TV(u(\alpha,x)) = \int_\Omega |\nabla_x u(\alpha,x)| dx \quad (1)$$

where $\nabla_x u$ represents the gradient of the image u at the position x.

To minimize the total variation TV ($\min\{TV(u(\alpha,x))\}$), the partial derivative is computed, giving:

$$\frac{\partial TV(u(\alpha,x))}{\partial \alpha} = \int_\Omega \frac{\partial |\nabla_x u(\alpha,x)|}{\partial \alpha} dx \quad (2)$$

After development, we obtain:

$$\frac{\partial TV(u(\alpha,x))}{\partial \alpha} = -\int_\Omega \nabla_x \cdot \left[\frac{\nabla_x u(\alpha,x)}{|\nabla_x u(\alpha,x)|}\right] \phi_{xi} dx \quad (3)$$

where:
$\phi_{xi}$ characterizes the core of the DCT transform; and $$\nabla_x \cdot \left[\frac{\nabla_x u}{|\nabla_x u|}\right]$$

expresses the curvature of the image, i.e. the divergence of the standardized gradient in the spatial domain.

This formula links the total variation TV semi-norm in the spatial domain and the DCT coefficients in the transform domain.

For $TV(u(\alpha,x))=0$, the associated Euler-Lagrange equations give $$\frac{\partial TV(u(\alpha,x))}{\partial \alpha} = 0.$$

For example, the search for the local minimum is done by means of a gradient descent type of iterative algorithm. It can be noted that other non-iterative methods can also be used.

Let $\alpha^{TV}$=DCT(curv(u)) (4), express the curvature (curv) of the image u in the transform domain. At each iteration i of the algorithm, the DCT coefficients $\alpha^i$ are updated as follows:

$$\alpha^i = \alpha^{i-1} + \gamma_i \alpha_i^{TV} \quad (5)$$

where $\gamma_i$ represents the learning step of the algorithm (fixed or variable according to i). The stop conditions of the algorithm can be the number of iterations i and/or the stability of the coefficients ($\alpha^i - \alpha^{i-1} < \epsilon$).

An example of computation of the curvature in a discrete space is described especially in T. F. Chan and J. Shen, "Mathematical models for local non-texture in paintings", SIAM (Journal of Applied Mathematics, Vol. 63, No. 3, pp. 1019-1043, 2002).

More specifically, if u(i,j) denotes the value of the pixel of the image at the position (i,j), the curvature obtained at the point (i,j) is expressed by:

$$curv_{ij} = \nabla_{ij} \cdot \left(\frac{\nabla_{ij} u(i,j)}{|\nabla_{ij} u(i,j)|}\right).$$

In a discrete space, a possible approximation is given by:

$$curv_{ij} \approx \frac{u(i+1,j) - u(i,j)}{\sqrt{(u(i+1,j) - u(i,j))^2 + \left(\frac{u(i+1,j-1) + u(i,j-1) - u(i,j+1) - u(i+1,j+1)}{2}\right)^2}} +$$

$$\frac{u(i,j) - u(i-1,j)}{\sqrt{(u(i,j) - u(i-1,j))^2 + \left(\frac{u(i-1,j-1) + u(i,j-1) - u(i,j+1) - u(i-1,j+1)}{2}\right)^2}} +$$

$$\frac{u(i,j-1) - u(i,j)}{\sqrt{(u(i,j-1) - u(i,j))^2 + \left(\frac{u(i-1,j-1) + u(i-1,j) - u(i+1,j) - u(i+1,j-1)}{2}\right)^2}} +$$

$$\frac{u(i,j) - u(i,j+1)}{\sqrt{(u(i,j) - u(i,j+1))^2 + \left(\frac{u(i-1,j+1) + u(i-1,j) - u(i+1,j) - u(i+1,j+1)}{2}\right)^2}}$$

Here below, the general principle of regularization of the signal according to the TV semi-norm is applied to the video encoding context.

More specifically, we consider a video encoder implementing a DCT type transform as illustrated in FIG. 2 for example and the restoration algorithm described here above during the estimation step 13.

Figure 4:
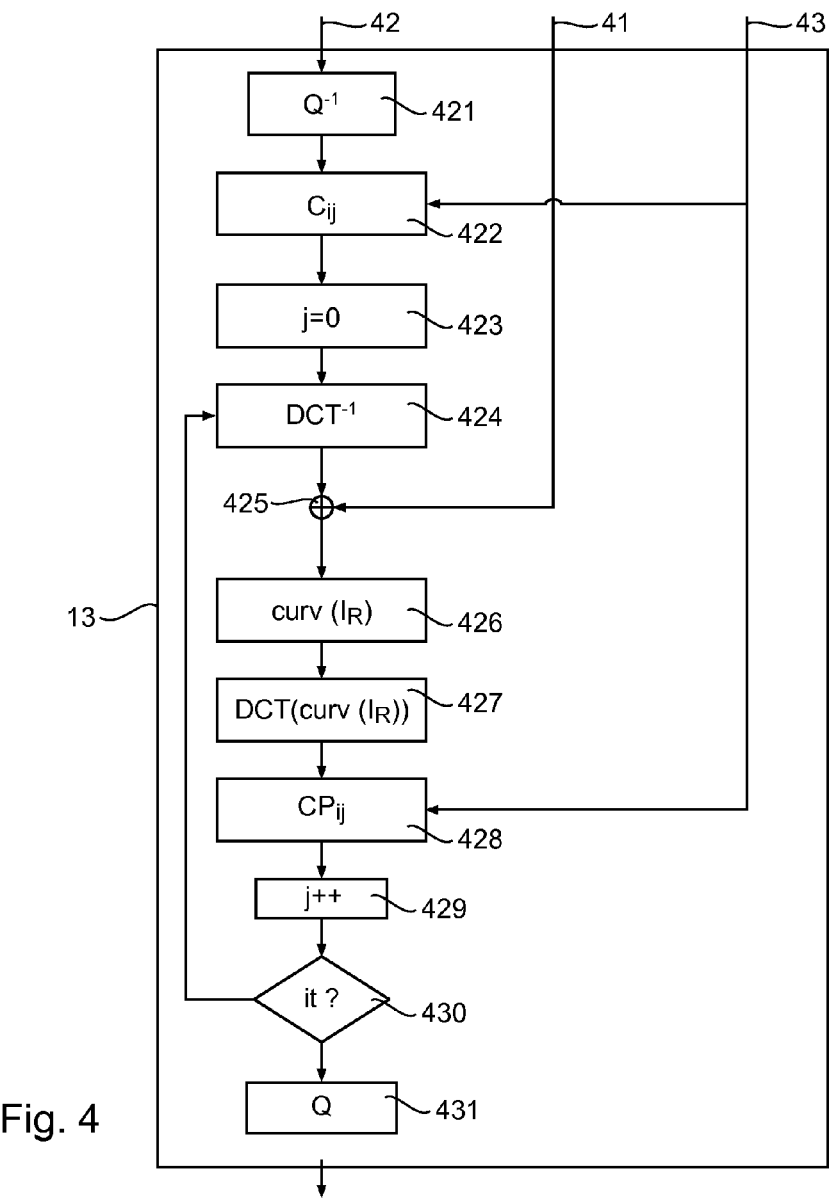
FIG. 4 presents an example of an algorithm for estimating coefficients.

FIG. 4 more specifically illustrates the implementation of such an algorithm.

At input, the algorithm receives, for at least one current block:
- a predicted block 41 in the spatial domain derived from the intra prediction operation 244 and/or inter prediction operation 245;
- a transform block 42 formed by a set of original coefficients representing the residual block in the transform domain;
- a piece of information 43 localizing DCT coefficients to be estimated (used to select the original coefficients forming the subset).

At output, the algorithm delivers a modified transform block in the transform domain comprising:
- at the positions corresponding to the original coefficients belonging to the subset: estimations of these coefficients;
- at other positions: original coefficients representing the residual block in the transform domain, identical to the coefficients of the transformed block 42.

More specifically, the restoration algorithm implements the following steps:
- inverse quantification $Q^{-1}$ referenced 421, applied to the transform block 42;
- assigning 422 of a zero value to the original coefficients Cij of the transform block, the position of which is identified through the piece of localizing information 43 delivering a modified transform block. In other words, in the transform block, the original coefficients belonging to the subset (for example the coefficients C01 and C10 identified in FIG. 3) are set at zero;
- initialization 423 of a variable j for the iterations such that j=0;
- inverse transform $DCT^{-1}$ 424 of the modified transform block delivering a modified block in the spatial domain;
- addition 425 of the modified block and of the predicted block 41 in the spatial domain delivering a rebuilt modified block;
- determining 426 the curvature of the image $I_R$ thus rebuilt in the causal spatial domain of the rebuilt modified block as described here above;
- determining 427 the curvature of the image $I_R$ in the transform domain according to the equation (4);
- regularizing 428 the original coefficients belonging to the subset (set at zero during the initialization of the first iteration) delivering estimated coefficients CPij in adding to them a value proportional to the curvature of the $I_R$ determined during the previous determining step 427 according to the equation (5) presented here above. A new modified transform block is thus obtained;
- incrementing 429 the variable j for the iterations.

Then, a test (430) is made to see if a stop criterion of the algorithm, such as the maximum iteration number and/or a stability of the regularized original coefficients, has been attained.

If the stop criterion is not attained, the operation returns to the inverse transform operation $DCT^{-1}$ 424, applied to the modified transform block coming from the regularization step 428.

If the stop criterion is attained, the modified transformed block coming from the regularization step 428 is quantified (431).

At output of the estimation step 13, we therefore obtain a modified transformed block formed by:
- coefficients regularized (i.e. estimated) at the positions corresponding to the original coefficients selected during the step for selecting 12;
- original coefficients representing the residual block in the transform domain, identical to the coefficients of the transformed block 42, at the other positions.

An advantageous implementation of the algorithm consists in estimating the coefficients of the subset iteratively and hierarchically. Thus, the first estimated coefficient will correspond to the coefficient of the subset representing the lowest frequency of the image, and so on and so forth until the coefficients corresponding to the highest frequencies are reached. At each iteration and once a coefficient is estimated, the coefficient residue is computed and encoded in order to use this coefficient to estimate the following coefficients according to the iterative process. Thus, this implementation starts by estimating the coefficient of the subset corresponding to the lowest frequency of the current block. The coefficient residue of this coefficient is then computed and encoded, and then the value of the corresponding original coefficient is reintegrated into the current block and used for the estimation of the following coefficient.

C) Determining and Encoding Residues of Coefficients

Here below, we describe the step 14 for determining residues of coefficients.

During this step, a difference is determined between the estimated coefficients CPij and the original coefficients Cij of the transform block 42 situated at a same position in the modified transform block and in the transform block.

Thus, for each position defined by the subset, we obtain a coefficient residue ECij.

The non-estimated original coefficients and the coefficient residues thus obtained are then quantified during the quantification operation Q referenced 232 and then encoded during the entropy encoding operation 23 instead of the residual block.

This embodiment of the invention therefore deliberately eliminates, at the encoding, those coefficients for which position is known (the position being either predetermined or chosen so as to select the original coefficients complying with a predetermined quality criterion). Then, these coefficients are estimated (at the encoder or decoder) so as not to transmit them or to transmit only the residue of the coefficient associated with them, thus more efficiently compressing the signal.

The proposed solution therefore improves the encoding in terms of compression performance as compared with an existing encoder (for example H.264/AVC), since the quantity of information to be transmitted is less great for a strictly identical rebuilding of the signal.

In other words, an embodiment of the invention proposes a novel method of estimation that gets integrated at the encoding level whereas the existing techniques do not propose to modify the encoding.

As a reminder, the existing techniques can be used only to improve the image, when decoding, from a signal which is initially identical at output of the encoder but potentially degraded following deterioration due to the transmission channel. These techniques of restoration therefore do not take account of the coefficients restored in a context of encoding but are aimed solely at rebuilding an acceptable signal before display on the encoder (post-processing). Furthermore, in most restoration solutions, the lost coefficients (their positions) are not known to the encoder which must work blindly in order to rebuild the image or have an identification module for identifying the position of the lost coefficients.

In other words, none of the techniques proposed in the prior art proposes to estimate or predict certain coefficients of the transform block in order to reduce the quantity of information transmitted.

3. Signal Representing the Image or the Image Sequence

The signal coming from the encoder, representing the image or the image sequence encoded according to the encoding technique described here above, can carry a specific piece of localizing information, making it possible to signal the position of the original coefficients selected to form the subset.

As indicated here above, this piece of information can be provided at different levels: at the sequence level, the image level, and possibly the block level.

Thus, this piece of information can be inserted into a table carrying the overall information of the sequence (in a field of the SPS, or sequence parameter set, for the H.264 encoder for example) in the form of a list comprising the positions of the N coefficients Cij to be estimated of the subset, for example in the form of a list of N "absolute" positions (position n for $1 \leq n \leq N$, defined by i*k+j, with i being the row index, k the row width and j the column index of the coefficient in the transformed block). This information can also be encoded by using a CPB (coded pattern block) type of encoding pattern as defined in the above-mentioned H.264 standard.

It can be noted that this signaling is optional when the encoder and the decoder use positions that are predetermined and therefore known to both parties.

4. Working of the Decoder

Here below, we describe the main steps implemented by a decoder according to an embodiment of the invention.

A decoder of this kind is deemed for example to implement a DCT type transform, like the associated encoder.

Figure 5:
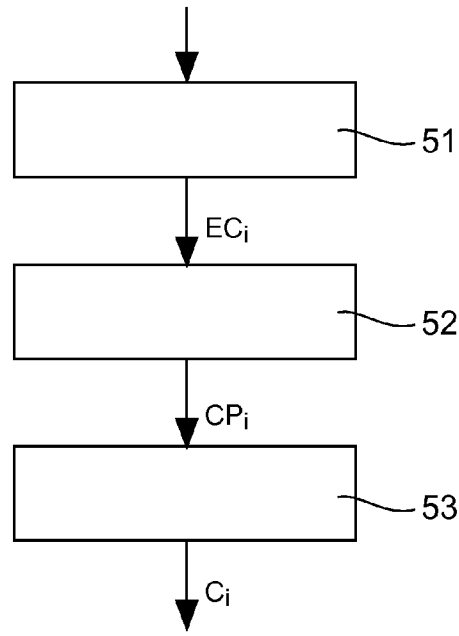
FIG. 5 presents the main steps implemented when decoding according to an embodiment of the invention.

Thus, as illustrated in FIG. 5, a decoder of this kind (for example an image or video decoder) implements the steps described here below for rebuilding at least one transformed block formed by a set of original coefficients.

For at least one original coefficient of the subset of original coefficients selected among said set, the following steps are implemented:

decoding 51 of a coefficient residue associated with the original coefficient;

estimation 52 of the original coefficient, delivering an estimated coefficient in the transform domain;

rebuilding 53 of the original coefficient, from the coefficient residue and the estimated coefficient.

The estimation step 52 is identical to the estimation step 13 implemented when encoding and is therefore not described in greater detail.

For each coefficient of the subset, the rebuilding step 53 consists in adding the coefficient residue obtained at the end of the decoding step 51 to the corresponding estimated coefficient (a step similar to the step 31 of inverse compensation implemented when encoding).

It can be noted that the subset of original coefficients selected is the same as that identified during the encoding.

To this end, two variants are envisaged.

According to a first variant, the position of the coefficients to be estimated in known to the encoder and the decoder. Thus, for example, in the case of the JPEG encoder as described here above, the decoder and the encoder both know the position of the coefficients to be estimated (C01 and C10 for a 8×8 block as illustrated in FIG. 3).

In this case, the decoder directly identifies the coefficients belonging to the subset from their predetermined position.

In another example, the decoder knows the direction of spatial prediction used to make the spatial prediction of the block to be encoded and can use this information, in the same way as the encoder, to deduce from it the position and number of coefficients to be estimated.

According to a second variant, the decoder implements a preliminary step for reading a piece of information signaling a position of the original coefficients selected to form the subset.

In this case, the decoder identifies the coefficients belonging to the subset from a reading of this piece of information.

Figure 6:
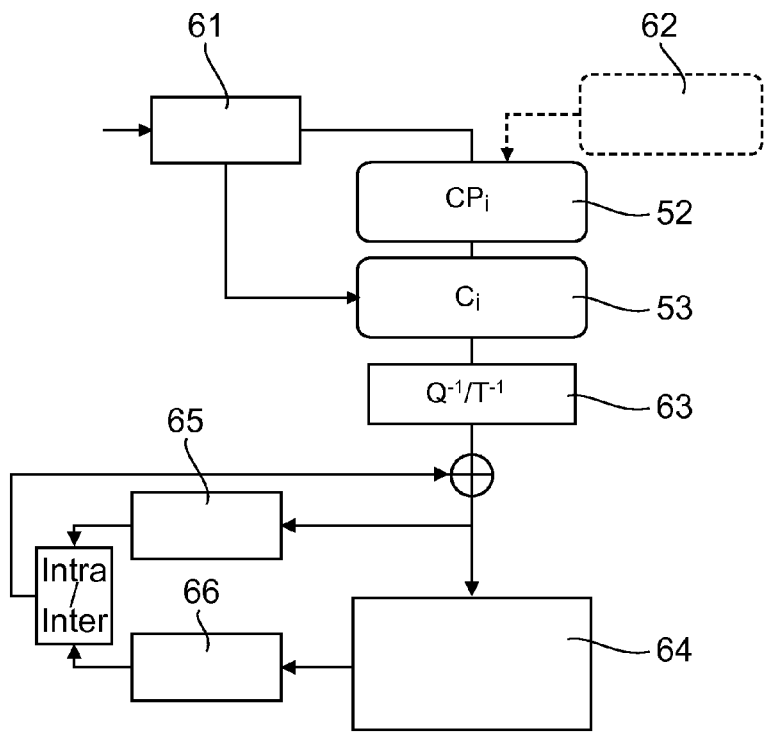
FIG. 6 illustrates an example of an architecture of a decoder according to FIG. 5.

A more precise description is given, with reference to FIG. 6, of the architecture of an H.264 type video decoder modified to implement an embodiment of the invention.

Such a decoder inputs a signal representing an image or an image sequence encoded according to the method for encoding described here above and implements an operation of entropy decoding 61. This decoding 61 makes it possible especially to decode the coefficient residue or residues conveyed by the signal and the original coefficients of the residual block not estimated when encoding.

As described with reference to FIG. 5, for the rebuilding of at least one transformed block, a subset of original coefficients to be estimated is selected, in taking account especially of their position 62 in the transformed block (either directly known to the decoder or obtained from a piece of localizing information extracted from the signal).

An estimation 52 is then made of these coefficients and the corresponding original coefficients are rebuilt 53 by adding the coefficient residues to the corresponding estimated coefficients.

At the end of this step 53, a rebuilt transformed block is obtained.

During the following step 63, operations of inverse quantification $Q^{-1}$ and inverse transform $T^{-1}$ are applied to the rebuilt transformed block, and then classic operations of image rebuilding 64, intra prediction 65 and/or inter prediction 66 (motion compensation) are implemented. These operations are well known to those skilled in the art, and are described in greater detail in the above-mentioned standard H.264.

5. Structure of the Encoder and of the Decoder

Figure 7:
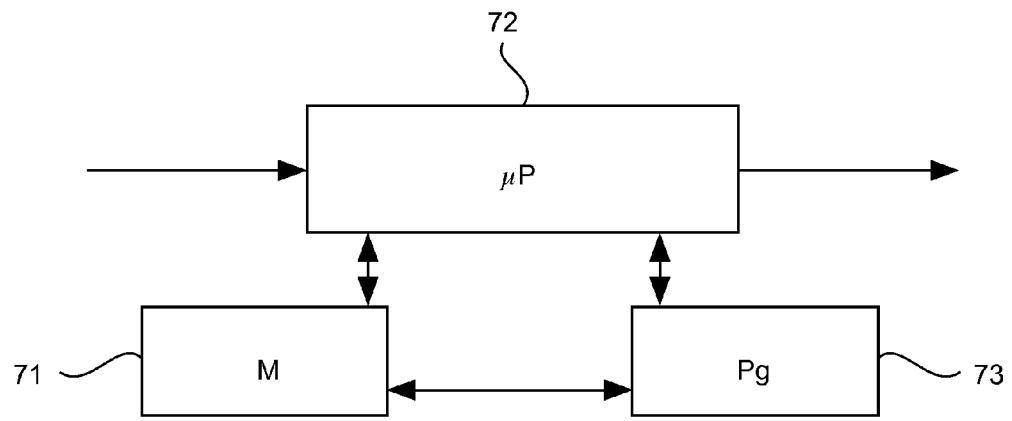
FIGS. 7 and 8 present the simplified structure of an encoder and a decoder according to the particular embodiment of the invention.
Figure 8:
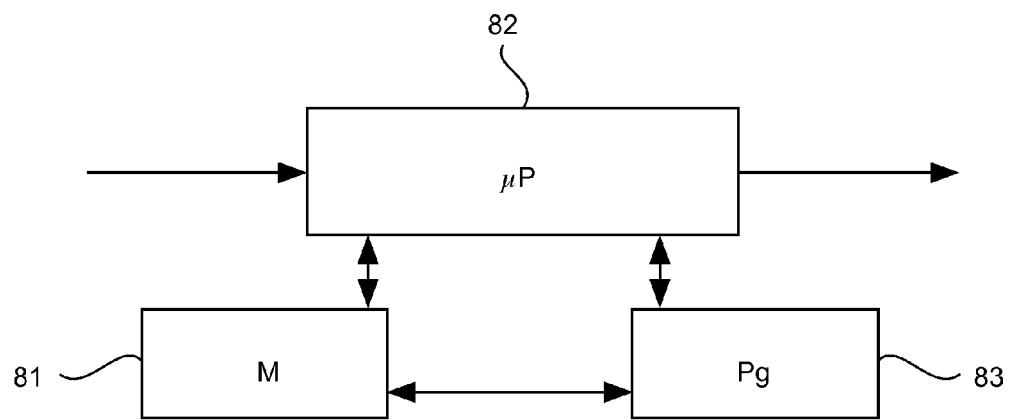

Referring finally to FIGS. 7 and 8, we present the simplified structure of an encoder and decoder, respectively implementing a technique for encoding and a technique for decoding according to one of the embodiments described here above.

For example, the encoder comprises a memory 71 comprising a buffer memory M, a processing unit 72, equipped for example with a processor P, and driven by a computer program Pg 73 implementing the method for encoding according to an embodiment of the invention.

At initialization, the code instructions of the computer program 73 are for example loaded into a RAM and then executed by the processor of the processing unit 72. The processing unit 72 inputs at least one image to be encoded. The processor of the processing unit 72 implements the steps of the encoding method described here above, according to the instructions of the computer program 73, to encode the image. To this end, the encoder device comprises, in addition to the buffer memory 71, means for transforming a current block from the spatial domain into a transform domain, means for selecting a subset of original coefficients, means for estimating at least one original coefficient, means for determining a corresponding coefficient residue and means for encoding the coefficient residue. These means are driven by the processor of the processing unit 72.

The decoder for its part comprises a memory 81 comprising a buffer memory M, a processing unit 82 equipped for example with a processor P and driven by a computer program Pg 83 implementing the method for decoding according to an embodiment of the invention.

At initialization, the code instructions of the computer program 83 are for example loaded into a RAM and then executed by the processor of the processing unit 82. The processing unit 82 inputs a signal representing at least one image. The processor of the processing unit 82 implements the steps of the method for decoding described here above according to the instructions of the computer program 83 to decode and rebuild the image. To this end, the decoder comprises, in addition to the buffer memory 81, means for decoding at least one coefficient residue associated with an original coefficient, means for estimating the corresponding original coefficient, and means for rebuilding the original coefficient. These means are driven by the processor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A method for encoding at least one image sub-divided into blocks, the method comprising:
    for at least one block to be encoded of said at least one image:
    predicting said at least one block to be encoded in a spatial domain, to obtain a predicted block,
    comparing said at least one block to be encoded with said predicted block, to obtain a residual block, called a current block, and
    transforming said current block from the spatial domain into a transform domain delivering a transform block, by an encoding device, said transform block being formed by a set of coefficients representing said current block, called original coefficients;
    selecting a subset of the original coefficients from said set, and
    for at least one original coefficient of said subset, performing the following acts with the encoding device:
        estimating said original coefficient, delivering an estimated coefficient in said transform domain, by:
            assigning a zero value to the original coefficients of said subset, delivering a modified transform block;
            restoring the modified transform block by implementing at least one iteration of the following sub-acts:
                transforming said modified transform block from the transform domain into the spatial domain, delivering a modified block in the spatial domain;
                adding said modified block and the predicted block in the corresponding spatial domain, delivering a rebuilt modified block;
                determining, in the spatial domain, a curvature of a rebuilt image comprising said rebuilt modified block; and
                updating the original coefficients of said subset, taking account of said curvature, transformed from the spatial domain into the transform domain, and of said modified transform block delivering a new modified transform block;
        determining a coefficient residue, by comparison of said original coefficient and of said estimated coefficient; and
        encoding said coefficient residue.

2. The method for encoding according to claim 1, wherein the method comprises inserting, into a signal representing said at least one image, at least one piece of information signaling a position of the original coefficients of said subset.

3. The method for encoding according to claim 1, wherein said act of restoring processes said original coefficients one after the other according to a rising order of frequency.

4. A device for encoding at least one image sub-divided into blocks, the device comprising:
    a processing unit, which is configured to encode the at least one image by:
    predicting at least one block to be encoded of said at least one image, in a spatial domain, to obtain a predicted block;
    comparing said at least one block to be encoded with said predicted block, to obtain a residual block, called a current block;
    transforming said current block from the spatial domain into a transform domain, delivering a transform block, said transform block being formed by a set of coefficients representing said current block, called original coefficients;
    selecting a subset of the original coefficients from said set;
    estimating at least one of said original coefficients, delivering an estimated coefficient in said transform domain, by:
        assigning a zero value to the original coefficients of said subset, delivering a modified transform block;
        restoring the modified transform block by implementing at least one iteration of the following sub-acts:
            transforming said modified transform block from the transform domain into the spatial domain, delivering a modified block in the spatial domain;
            adding said modified block and the predicted block in the corresponding spatial domain, delivering a rebuilt modified block;
            determining, in the spatial domain, a curvature of a rebuilt image comprising said rebuilt modified block; and
            updating the original coefficients of said subset, taking account of said curvature, transformed from the spatial domain into the transform domain, and of said modified transform block delivering a new modified transform block;
    determining a coefficient residue, by comparison of said original coefficient and of said estimated coefficient; and
    encoding said coefficient residue.

5. A method for decoding at least one encoded image, wherein the method comprises:
    rebuilding at least one transform block formed by a set of original coefficients representing a residual block in a transform domain, to obtain a rebuilt transform block, said residual block being obtained by comparison of a block to be encoded of an original image subdivided into blocks and a predicted block obtained by prediction of said block to be encoded,
    said rebuilding performing the following acts for at least one original coefficient of a subset of original coefficients, selected from said set with a decoding device:

decoding a coefficient residue associated with said original coefficient;
estimating said original coefficient, delivering an estimated coefficient in said transform domain, by:
assigning a zero value to the original coefficients of said subset, delivering a modified transform block;
restoring the modified transform block by implementing at least one iteration of the following sub-acts:
transforming said modified transform block from the transform domain into the spatial domain, delivering a modified block in the spatial domain;
adding said modified block and the predicted block in the corresponding spatial domain, delivering a rebuilt modified block;
determining, in the spatial domain, a curvature of a rebuilt image comprising said rebuilt modified block; and
updating the original coefficients of said subset, taking account of said curvature, transformed from the spatial domain into the transform domain, and of said modified transform block delivering a new modified transform block;
rebuilding said original coefficient from said coefficient residue and said estimated coefficient;
inverse transforming the rebuilt transform block, to obtain an inverse block in the spatial domain, and
predicting and rebuild the original image, from the inverse block.

6. The method for decoding according to claim 5, wherein the method comprises reading, in a signal representing said at least one encoded image, at least one piece of information signaling a position of the original coefficients of said subset.

7. A device for decoding at least one encoded image, the device comprising:
a processing unit, which is configured to decode the at least one encoded image by:
rebuilding at least one transform block formed by a set of original coefficients representing a residual block in a transform domain, to obtain a rebuilt transform block, said residual block being obtained by comparison of a block to be encoded of an original image subdivided into blocks and a predicted block obtained by prediction of said block to be encoded;
performing for at least one original coefficient of a subset of original coefficients selected from said set:
decoding a coefficient residue associated with said original coefficient;
estimating said original coefficient, delivering an estimated coefficient in said transform domain, by:
assigning a zero value to the original coefficients of said subset, delivering a modified transform block;
restoring the modified transform block by implementing a technique of regularization in the spatial domain, said act of restoring implementing at least one iteration of the following sub-acts:
transforming said modified transform block from the transform domain into the spatial domain, delivering a modified block in the spatial domain;
adding said modified block and the predicted block in the corresponding spatial domain, delivering a rebuilt modified block;
determining, in the spatial domain, a curvature of a rebuilt image comprising said rebuilt modified block; and
updating the original coefficients of said subset, taking account of said curvature, transformed from the spatial domain into the transform domain, and of said modified transform block delivering a new modified transform block; and
rebuilding said original coefficient from said coefficient residue and said estimated coefficient;
inverse transforming the rebuilt transform block, to obtain an inverse block in the spatial domain; and
predicting and rebuilding the original image, from the inverse block.

8. A non-transitory computer-readable medium comprising a computer program comprising instructions to implement a method for encoding at least one image sub-divided into blocks, when the program is executed by a processor, wherein the instructions comprise:
instructions that configure the processor to predict at least one block to be encoded of said at least one image, in the spatial domain, to obtain a predicted block;
instructions that configure the processor to compare said at least one block to be encoded with said predicted block, to obtain a residual block, called a current block;
instructions that configure the processor to transform said current block from the spatial domain into a transform domain delivering a transform block by an encoding device, said transform block being formed by a set of coefficients representing said current block, called original coefficients; and
instructions that configure the processor to select a subset of the original coefficients from said set, and for at least one original coefficient of said subset, performing the following acts with the encoding device:
estimating said original coefficient, delivering an estimated coefficient in said transform domain, by:
assigning a zero value to the original coefficients of said subset, delivering a modified transform block;
restoring the modified transform block by implementing at least one iteration of the following sub-acts:
transforming said modified transform block from the transform domain into the spatial domain, delivering a modified block in the spatial domain;
adding said modified block and the predicted block in the corresponding spatial domain, delivering a rebuilt modified block;
determining, in the spatial domain, a curvature of a rebuilt image comprising said rebuilt modified block; and
updating the original coefficients of said subset, taking account of said curvature, transformed from the spatial domain into the transform domain, and of said modified transform block delivering a new modified transform block;
determining a coefficient residue, by comparison of said original coefficient and of said estimated coefficient; and
encoding said coefficient residue.

9. A non-transitory computer-readable medium comprising a computer program comprising instructions to implement a method for decoding at least one encoded image, when the program is executed by a processor, wherein the instructions configure the processor to perform acts of:
rebuilding at least one transform block formed by a set of original coefficients representing a residual block in a transform domain, to obtain a rebuilt transform block, said residual block being obtained by comparison of a block to be encoded of an original image subdivided into blocks and a predicted block obtained by prediction of said block to be encoded;

performing the following acts for at least one original coefficient of a subset of original coefficients, selected from said set:

decoding a coefficient residue associated with said original coefficient;

estimating said original coefficient, delivering an estimated coefficient in said transform domain, by:

assigning a zero value to the original coefficients of said subset, delivering a modified transform block;

restoring the modified transform block by implementing at least one iteration of the following sub-acts:

transforming said modified transform block from the transform domain into the spatial domain, delivering a modified block in the spatial domain;

adding said modified block and the predicted block in the corresponding spatial domain, delivering a rebuilt modified block;

determining, in the spatial domain, a curvature of a rebuilt image comprising said rebuilt modified block; and updating the original coefficients of said subset, taking account of said curvature, transformed from the spatial domain into the transform domain, and of said modified transform block delivering a new modified transform block; and rebuilding said original coefficient from said coefficient residue and said estimated coefficient;

inverse transforming the rebuilt transform block, to obtain an inverse block in the spatial domain, and predicting and rebuilding the original image, from the inverse block.

10. The method for encoding according to claim 1, wherein said act of selecting selects the original coefficients localized at a predetermined position in the transform block.

11. The method for encoding according to claim 1, wherein said act of selecting selects the original coefficients according to a predetermined criterion of encoding.

12. The method for encoding according to claim 11, wherein said encoding criterion belongs to the group consisting of:

a transmission bit rate;
a quality of transmission;
a direction of prediction of the current block.

* * * * *